(12) United States Patent
Chou et al.

(10) Patent No.: US 7,234,971 B2
(45) Date of Patent: Jun. 26, 2007

(54) MOTHERBOARD AND EXPANDABLE PCI EXPRESS SLOT THAT ACCEPTS DIFFERENT INTERFACE CARDS

(75) Inventors: Hung-Hsiang Chou, Taipei (TW); Chuan-Te Chang, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 0 days.

(21) Appl. No.: 11/311,270

(22) Filed: Dec. 20, 2005

(65) Prior Publication Data

US 2006/0160414 A1    Jul. 20, 2006

(30) Foreign Application Priority Data

Dec. 31, 2004   (TW)   ............... 93141912 A

(51) Int. Cl.
*H01R 24/00*   (2006.01)
(52) U.S. Cl. .................................. 439/630
(58) Field of Classification Search ............. 439/541.5, 439/636, 637, 327, 323, 630, 632, 638, 377, 439/61, 65; 361/784; 710/300, 301
See application file for complete search history.

(56) References Cited

U.S. PATENT DOCUMENTS

| | | | | |
|---|---|---|---|---|
| 6,046,912 | A * | 4/2000 | Leman | 361/784 |
| 6,261,104 | B1 * | 7/2001 | Leman | 439/61 |
| 6,408,352 | B1 * | 6/2002 | Hosaka et al. | 710/301 |
| 6,527,562 | B2 * | 3/2003 | Tanaka et al. | 439/65 |
| 6,599,134 | B1 * | 7/2003 | Duarte et al. | 439/61 |
| 6,701,400 | B2 * | 3/2004 | Hayes et al. | 710/301 |
| 6,780,018 | B1 * | 8/2004 | Shipe | 439/636 |
| 6,808,408 | B2 * | 10/2004 | Jiang | 439/377 |
| 6,817,875 | B2 * | 11/2004 | Chang et al. | 439/159 |
| 6,824,413 | B1 * | 11/2004 | Shipe et al. | 439/326 |
| 6,863,572 | B1 * | 3/2005 | Yi et al. | 439/637 |

FOREIGN PATENT DOCUMENTS

CN   1704864   12/2005

* cited by examiner

*Primary Examiner*—Chandrika Prasad
(74) *Attorney, Agent, or Firm*—Rabin & Berdo, PC

(57) ABSTRACT

A motherboard includes a PCI Express slot and a chipset. The PCI Express slot has four sidewalls; a topside of the PCI Express slot has a first aperture, and one of the four sidewalls has a second aperture. The first and second apertures are connected together in order to form an accommodation space for accepting an interface card. The chipset is electrically connected to the PCI Express slot. The interface card communicates with the chipset through the PCI Express slot.

8 Claims, 3 Drawing Sheets

US 7,234,971 B2

MOTHERBOARD AND EXPANDABLE PCI EXPRESS SLOT THAT ACCEPTS DIFFERENT INTERFACE CARDS

This application claims the benefit of Taiwan Application Serial No. 093141912, filed on Dec. 31, 2004, the subject matter of which is incorporated herein by reference.

BACKGROUND OF THE INVENTION

1. Field of the Invention

The invention relates in general to a motherboard, and more particularly to a motherboard having an expandable PCI Express slot.

2. Description of the Related Art

Computer bus specifications have been developed from the ISA architecture (16 bit@8.33 Mhz) of the 1980 years to the Peripheral Component Interconnect (PCI) architecture (32 bit@33 Mhz) of the 1990 years and to the current AGP architecture (32 bit@66 Mhz). In the current peripheral interface card, particularly the graphics card (or display card), however, the data transmission amount thereof is getting more and more insufficient under the transmission architecture of the bus AGP. So, a new Peripheral Component Interconnect Express (PCI Express) bus specification has been proposed.

The PCI Express utilizes the switch type peer-to-peer sequence transmission technology. The data transmission of the PCI Express utilizes a transmitter (Tx) and a receiver (Rx), which constitute a simplex lane. Each PCI Express individually utilizes its own lane to communicate with the corresponding chipset on the motherboard, and the bus-sharing architecture of the conventional PCI is no longer used.

The current transmission speed in the PCI Express single lane may reach 250 MB/s, and the occasion in the single lane is referred to as the PCI Express x1 (one lane) having a transmission bandwidth of 1×500=500 MB/s. In order to cover the transmission bandwidth requirements in various level fields, the current PCI Express has various specifications of x1, x2, x4, x8, x16, x32, and the like. Different specifications have different lead size, and thus have different physical lengths and lanes numbers. The transmission bandwidth between the motherboard chipset and the graphics interface starts from the PCI Express x16 specification to 8 GB/s, which is sixteen times that of the PCI Express x1 and approaches four times of the current AGP X8 of 2.1 GB/s.

FIG. 1 (prior art) is a schematic illustration showing a conventional motherboard. Referring to FIG. 1, the conventional motherboard 100 generally includes a PCI Express x16 slot 110, two PCI Express x1 slots 120 and 130, and a chipset (not shown in FIG. 1). The PCI Express x16 slot 110 is able to accept the PCI Express x1, x2, x4, x8 and x16 interface cards, but the PCI Express x1 slot is able to accept only the PCI Express x1 interface card.

However, the display card or graphics card available in the commercial market would be the specification of PCI Express x16 and includes only one PCI Express slot (i.e. the PCI Express x16 slot 110 of FIG. 1) on the conventional motherboard 100 to accept the PCI Express x16 interface card. Thus, the conventional motherboard 100 can't drive the extend monitor that needs another PCI Express x16 display card to support, even if the PCI Express x1 slots 120 and 130 disposed on the motherboard.

SUMMARY OF THE INVENTION

It is therefore an object of the invention to provide a motherboard capable of expanding the use of the PCI Express x1 slot so as to support the PCI Express interface card having more than one lanes, such as of PCI Express specification of x1, x2, x4, x8, x16 or more lanes, without changing the original layout on the motherboard.

The invention achieves the above-identified object by providing a motherboard, which comprises a PCI Express slot and a chipset. The PCI Express slot has four sidewalls. The topside of the PCI Express slot has a first aperture, and one of the four sidewalls has a second aperture. The first and second apertures are connected together in order to form an accommodation space for accepting an interface card. The chipset is electrically connected to the PCI Express slot. The interface card communicates with the chipset through the PCI Express slot.

Further, the invention achieves the above-identified object by providing a slot, which comprises a body and several terminals. The slot is disposed on a motherboard. The body has four sidewalls. The topside of the body has a first aperture, and one of the four sidewalls has a second aperture. The first and second apertures are connected together in order to form an accommodation space for accepting an interface card. Those terminals are disposed in the body. When a first interface card is plugged into the body, several contacts on the first interface card are electrically connected to the terminals. When a second interface card is plugged into the body, a part of a plurality of contacts on the second interface card are electrically connected to the terminals, and a part of contacts are outside the body.

Furthermore, the invention achieves the above-identified object by providing a motherboard, which comprises a slot. The slot has four sidewalls. The topside of the PCI Express slot has a first aperture, and one of the four sidewalls has a second aperture. The first and second apertures are connected together in order to form an accommodation space for accepting a second interface card.

Other objects, features, and advantages of the invention will become apparent from the following detailed description of the preferred but non-limiting embodiments. The following description is made with reference to the accompanying drawings.

DETAILED DESCRIPTION OF THE INVENTION

Figure 1:
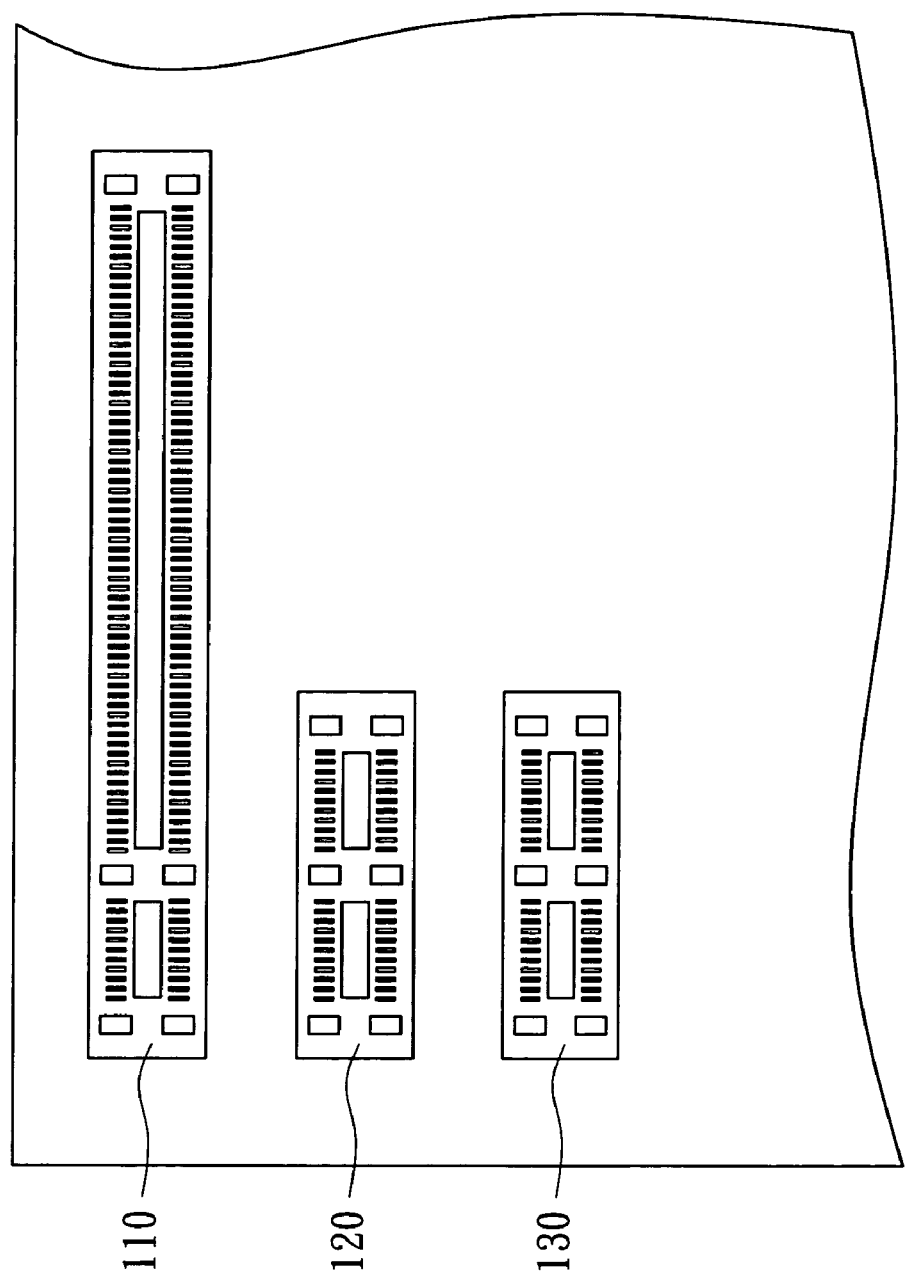
FIG. 1 (prior art) is a schematic illustration showing conventional motherboard according to the prior art.

Currently, the PCI Express interfaces have various specifications of transmission bandwidths, such as x1, x2, x4, x8, x16, x32, and the like, and various PCI Express interfaces have different lead sizes. Thus, every different kind of graphics interface card may have different respective physical sizes, and a corresponding numbers of lanes, such as 1 lane, 2 lanes, 4 lanes, 8 lanes, 16 lanes, or 32 lanes. However, the PCI Express has a downwards compatible design. For example, the PCI Express x16 slot can be connected to x16 interface card as well as x8, x4, x2 or x1 interface card, and it can be operated with the corresponding transmission bandwidth. When the x16 interface card is inserted into the PCI Express x16 slot, the PCI Express x16 interface can operate with the x16 transmission bandwidth as well as the x8, x4, x2 or x1 transmission bandwidth. In other words, the PCI Express x16 graphics interface has 16 lanes electrically connected to the chipset. When the PCI Express x16 slot is connected to the inserted x16 graphics card, the x16 graphics card communicates with the chipset through the 16 lanes of the PCI Express x16 slot. The maximum transmission bandwidth between the PCI Express x16 graphics slot and the x16 graphics card is 8 GByte/s. Alternatively, when the PCI Express x16 slot is connected to the inserted x2 network interface card, the x2 network interface card communicates with the chipset through the 2 lanes of the PCI Express x16 slot. The maximum transmission bandwidth between the PCI Express x16 slot and the x2 network interface card is 1 GByte/s.

In the other way, the PCI Express x16 interface card can also communicate with the x1 slot, but the transmission bandwidth will be decreased. When the x16 graphics card could communicate with the chipset through 1 lanes of the PCI Express x1 interface, the transmission bandwidth between the PCI Express x1 slot and the x16 graphics card is 500 MByte/s.

The main idea of the invention is providing an expandable PCI Express slot. The PCI Express slot has four sidewalls. The topside of the slot has a first aperture, and one of the four sidewalls has a second aperture. The first and second apertures are connected together in order to form an accommodation space for accepting a second interface card. The PCI Express xN slot (N is of natural numbers, and N≦16) can support the PCI Express x1, x2, x4, x8, x16, x32 interface cards and cards of any other number of lanes without changing the original layout of the mother board. The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Figure 2:
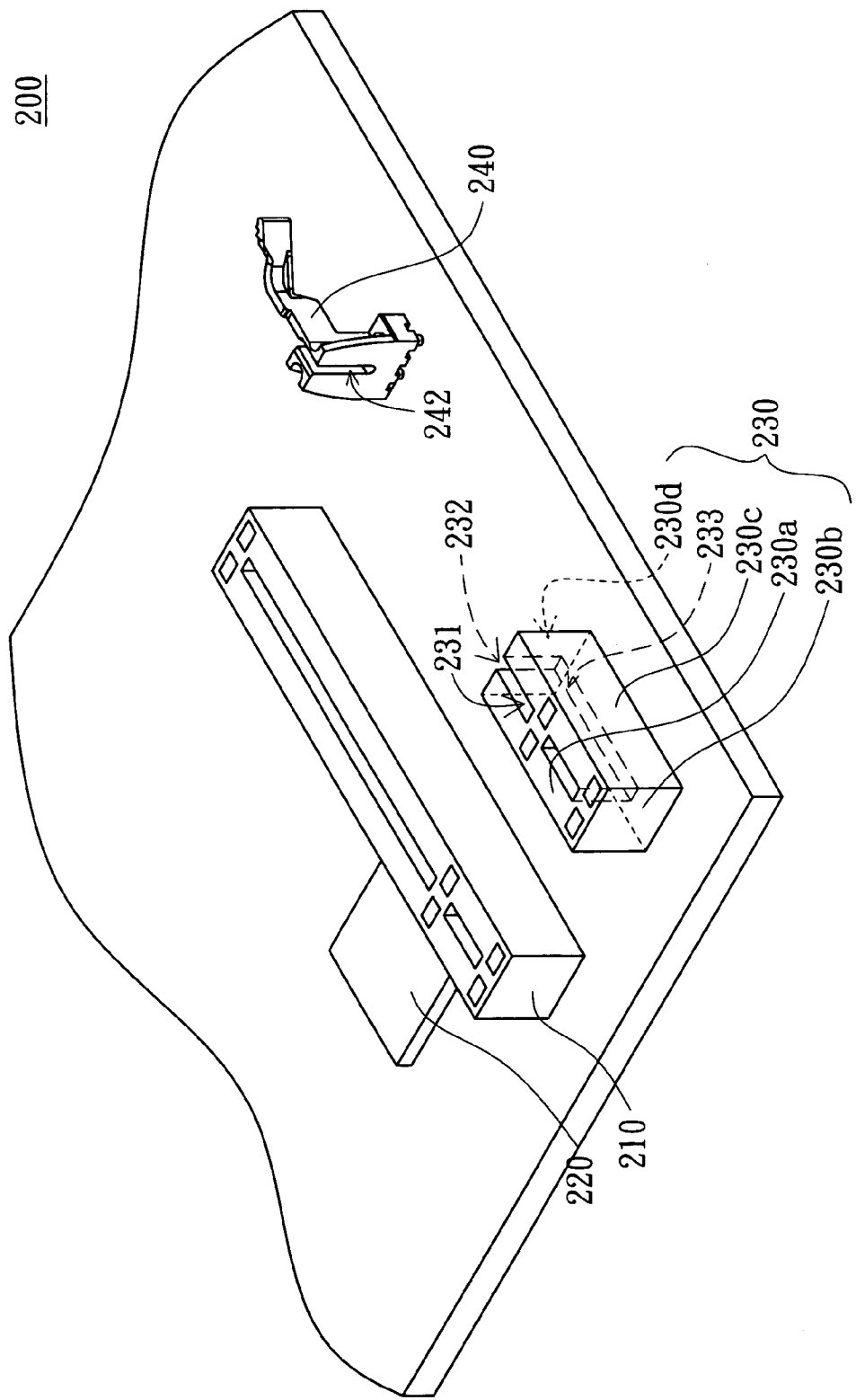
FIG. 2 is a topside view illustrating a motherboard according to the preferred embodiment of the present invention.

Referring to FIG. 2, which is a topside view illustrating a motherboard according to the preferred embodiment of the present invention. The motherboard 200 of the embodiment includes a PCI Express x16 slot 210, a chipset 220, a PCI Express slot 230 and a supporter 240. The PCI Express x16 slot 210 is used for accepting a first interface card, such as graphics card or display card of PCI Express interface.

The PCI Express slot, such as the PCI Express slot 230, includes a body and several terminals (not shown). The body has four sidewalls 230a, 230b, 230c, and 230d. The topside of the body has a first aperture 231, and one of the four sidewalls (e.g. the sidewall 230d) has a second aperture 232. The first and second apertures 231 and 232 are connected together in order to form an accommodation space for accepting an interface card. Those terminals are disposed in the body 230. The supporter 240 is disposed in the direction extending from the PCI Express slot 230 for accepting the second interface card. For example, the supporter 240 is a retention lock having a slit 242.

In general, when a first interface card, such as a PCI Express x1 interface card, is plugged into the body of the PCI Express slot 230, the contacts of the first interface card are electrically connected to the terminals of the PCI Express slot 230. Then, the chipset 220 is electrically connected to the PCI Express slot 230, and the first interface card communicates with the chipset 220 through the PCI Express slot 230 by the transmission bandwidth of one lane.

Figure 3:
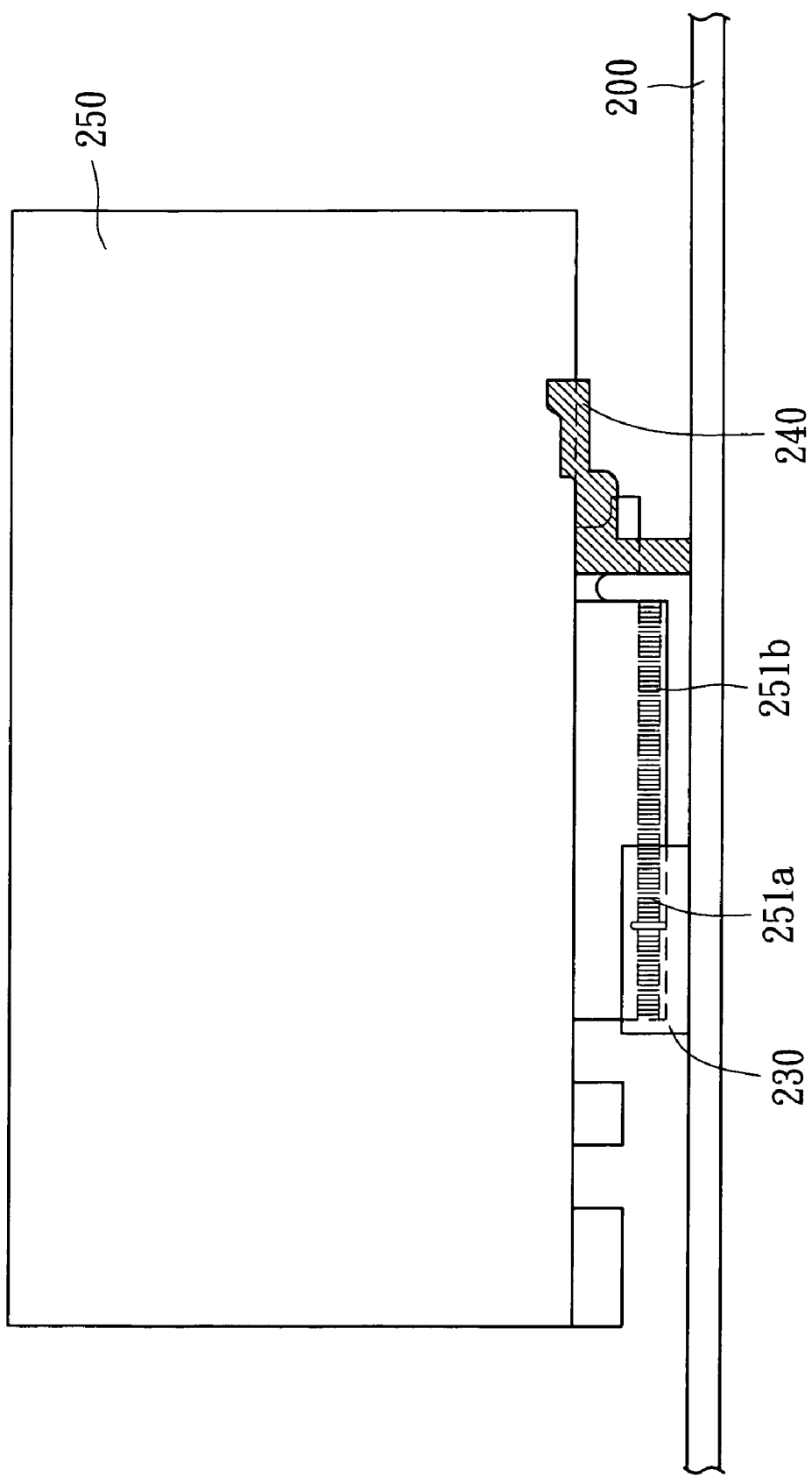
FIG. 3 is a side view of the motherboard in FIG. 2 when a PCI Express x16 card is plugged into the PCI Express slot and the supporter.

Referring to FIG. 3, which is a side view of the motherboard in FIG. 2 when a PCI Express x16 card is plugged into the PCI Express slot and the supporter. When a second interface card 250, such as a PCI Express x16 interface card, is plugged into the body of the PCI Express slot 230, a part of those contacts 251a on the second interface card 250 are electrically connected to the terminals in the body of the PCI Express slot 230, and other part of those contacts 251b are outside the body of the PCI Express slot 230. Meanwhile, the second interface card 250 is also inserted into the slit (labeled as 242 in FIG. 2), so that the body of the PCI Express slot 230 and the supporter 240 jointly accept the second interface card 250. Thus, the second interface card 250 is separated from the motherboard 200 by a distance to avoid unnecessary electrically connection. Preferably, the area between the PCI Express slot 230 and the supporter 240 might be set as a limited region in which no exposed contacts or traces to prevent short problem or unnecessary electrically connection.

It is noted that the second interface card is not limited to the PCI Express x16 interface card, and it can be a PCI Express interface card with 1, 2, 4, or 16 lanes. Those kind of the cards can plugged into the PCI Express slot of the embodiment, and are so compatible with the PCI Express slot of the embodiment that PCI Express slot of the embodiment can perform all the functions of each interface cards stated above.

Further, the PCI Express slot of the embodiment is not limited to the PCI x1 slot, it can be all of the PCI Express slots with equally to or less than 16 lanes. Thus, the PCI Express slot of the embodiment might be PCI Express x1 slot, PCI Express x2 slot, PCI Express x4 slot or PCI Express x8 slot.

Furthermore, whether contact number of the PCI Express interface card is less than, equal to or more than the terminal number of the PCI Express slot of the embodiment, any PCI Express interface card can be plugged into the PCI Express slot of the embodiment.

As described hereinbefore, the motherboard and the PCI Express slot thereof has following advantages. The apertures of the sidewall and the topside are connected together to form an accommodation space to accepting the PCI Express interface card with different lanes number, especially the card with more lanes than terminals of the slot inserted thereinto. That is, whether contact number of the PCI Express interface card is less than, equal to or more than the terminal number of the PCI Express slot of the embodiment, any PCI Express interface card can be plugged into the PCI Express slot of the embodiment. Also, the supporter also accepts the interface card, and keeps a gap between the PCI Express interface card and the motherboard to avoid short problem or other unnecessary electrically connection.

While the invention has been described by way of examples and in terms of preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A motherboard, comprising:

a peripheral component interconnect (PCI) Express slot having four sidewalls, a topside of the PCI Express slot having a first aperture, one of the four sidewalls having a second aperture, the first and second apertures being connected together in order to form an accommodation space for accepting any one of at least two differently dimensioned interface cards;

a chipset electrically connected to the PCI Express slot; and a supporter disposed in a direction extending from the PCI Express slot, and being used to support an end of at least one of the at least two interface cards, and being separated from the PCI Express slot by an empty space;

wherein the any one interface card communicates with the chipset through the PCI Express slot; and wherein the at least one of the at least two interface cards spans the space separating the PCI Express slot and the supporter, the at least one interface card is disposed, so as to not touch, the motherboard.

2. The motherboard according to claim 1, wherein the supporter is a retention lock.

3. The motherboard according to claim 1, wherein the supporter has having a slit, the at least one interface card being inserted therein when the interface card is plugged into the PCI Express slot, so that the PCI Express slot and the supporter jointly accept the at least one interface card.

4. The motherboard according to claim 1, further comprising:

a PCI Express x16 slot for accepting another interface card.

5. A motherboard, comprising:

a slot having four sidewalls, a topside of the PCI Express slot having a first aperture, one of the four sidewalls having a second aperture, the first and second apertures being connected together in order to form an accommodation space for accepting an interface card; and a supporter disposed in the direction extending from the slot, for accepting an end of the interface card, the supporter being separated from the slot by an empty space, with motherboard being free of any exposed contacts and traces in the space.

6. The motherboard according to claim 5, wherein the supporter is a retention lock.

7. The motherboard according to claim 5, wherein the supporter has a slit, and the interface card is inserted therein when the interface card is plugged into the slot, so that the slot and the supporter jointly accept the interface card.

8. The motherboard according to claim 5, wherein the slot is a PCI Express x8 slot.

* * * * *